(12) United States Patent
Juan

(10) Patent No.: US 9,998,786 B2
(45) Date of Patent: Jun. 12, 2018

(54) SET-TOP BOX AND METHOD FOR REDUCING POWER CONSUMPTION OF A REMOTE CONTROL

(71) Applicant: NANNING FUGUI PRECISION INDUSTRIAL CO., LTD., Nanning (CN)

(72) Inventor: Yi-Cheng Juan, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days. days.

(21) Appl. No.: 15/249,485

(22) Filed: Aug. 29, 2016

(65) Prior Publication Data

US 2018/0063581 A1 Mar. 1, 2018

(51) Int. Cl.
| H04N 7/16 | (2011.01) |
| H04N 21/443 | (2011.01) |
| H04N 21/422 | (2011.01) |
| H04N 21/442 | (2011.01) |
| H04N 21/45 | (2011.01) |

(52) U.S. Cl.
CPC ....... *H04N 21/4436* (2013.01); *H04N 21/422* (2013.01); *H04N 21/42207* (2013.01); *H04N 21/44227* (2013.01); *H04N 21/4516* (2013.01)

(58) Field of Classification Search
CPC combination set(s) only.
See application file for complete search history.

(56) References Cited

U.S. PATENT DOCUMENTS

2009/0249086 A1* 10/2009 Reams ................. G08C 17/02
713/300

FOREIGN PATENT DOCUMENTS

| CN | 102523402 A | 6/2012 |
| CN | 202957938 U | 5/2013 |
| CN | 102523402 B | 11/2014 |
| TW | 201012087 A1 | 3/2010 |

\* cited by examiner

*Primary Examiner* — Mulugeta A Mengesha
(74) *Attorney, Agent, or Firm* — ScienBiziP, P.C.

(57) ABSTRACT

A method for reducing power consumption of a controller remotely controlling a set-top box (STB) is executed by the STB. The STB comprises an STB-power-management table comprising multiple STB-power-management modes and multiple STB-connection parameters corresponding to the multiple STB-power-management modes. At least one remote controller (RC) is in communication with the STB. The method comprises the detection of a currently activated application or currently played contents within the STB. A mode and connection status between the STB and the RC is updated according to the detected information.

4 Claims, 5 Drawing Sheets

|  | time of scan window (ms) | time of scan-window interval (ms) | time of connection interval (ms) | number of times of slave latency | time of connection timeout (s) |
|---|---|---|---|---|---|
| performance mode | 20 | 10 | 7.5 | 4 | 2 |
| voice-input mode | 30 | 10 | 10 | 6 | 3 |
| Television mode | 100 | 10 | 30 | 20 | 5 |
| normal mode | 12.5 | 85 | 30 | 50 | 5 |
| keep-alive mode | 12.5 | 85 | 1 | 10 | 30 |
| standby mode | 12.5 | 85 | 0 | 0 | 0 |

FIG. 1

| | time of idle timeout (s) | time of advertisement interval (ms) | time of device mode timeout (ms) | time of connection interval (ms) | number of times of slave latency | time of connection timeout (s) |
|---|---|---|---|---|---|---|
| performance mode | 0 | 10 | 600 | 7.5 | 4 | 2 |
| voice-input mode | 0 | 20 | 1 | 10 | 6 | 3 |
| Television mode | 300 | 100 | 300 | 30 | 20 | 5 |
| normal mode | 10 | 100 | 300 | 30 | 50 | 5 |
| keep-alive mode | 0 | 5 | 0 | 1 | 10 | 30 |
| standby mode | 0 | 0 | 0 | 0 | 0 | 0 |

FIG. 2

SET-TOP BOX AND METHOD FOR REDUCING POWER CONSUMPTION OF A REMOTE CONTROL

FIELD

The subject matter herein generally relates to data communications.

BACKGROUND

Traditionally, power consumption and efficiency of a Remote Controller (RC) can be controlled by adjusting settings. However it is difficult to achieve a balance between the power consumption and the efficiency. How to achieve the balance is a problem to be solved.

BRIEF DESCRIPTION OF THE DRAWINGS

Implementations of the present technology will now be described, by way of example only, with reference to the attached figures, wherein:

FIG. 1 illustrates an embodiment of a Set-Top Box (STB)-management table of a set-top box (STB) in accordance with the present disclosure;

FIG. 2 illustrates an embodiment of a RC-management table of a remote controller in accordance with the present disclosure;

DETAILED DESCRIPTION

Figure 3:
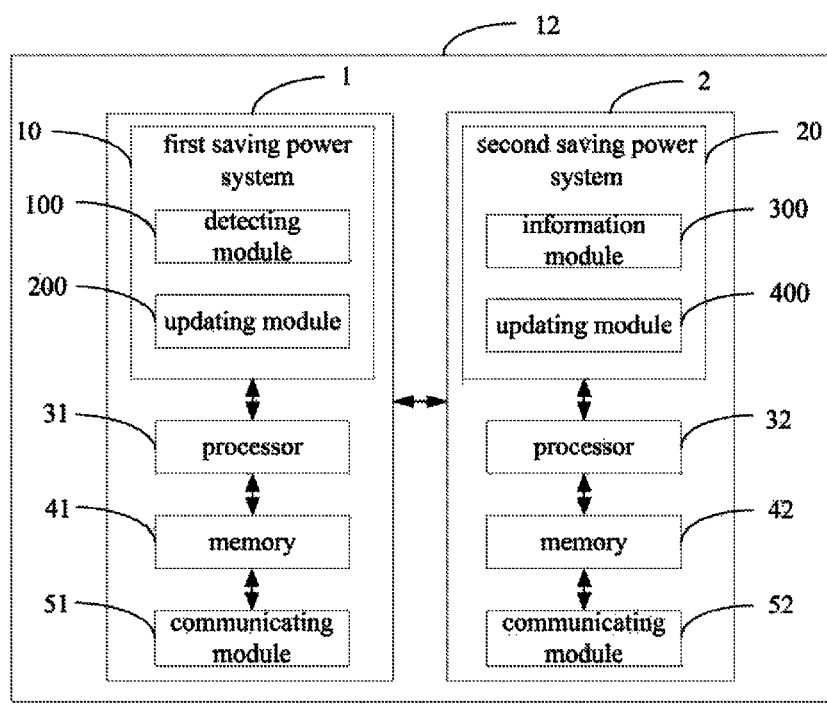
FIG. 3 illustrates a block view of an embodiment of functional modules of a multimedia system in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

In an embodiment of the present disclosure, a multimedia system 12 includes a set-top box 1 and a remote controller 2. The set-top box 1 connects with the remote controller 2 and is controlled by the remote controller 2. The remote controller 2 may be, for example, a mobile device provided with functions of remote control, a mobile device installed with remote control applications, and the like. Embodiments herein are introduced via a BLUETOOTH remote controller.

Referring to FIGS. 1 and 2, the set-top box 1 stores an STB-management table, STB-power-management parameters, and STB-connection parameters. The remote controller 2 stores an RC-management table, RC-power-management parameters, and RC-connection parameters. The STB-management table includes multiple STB-power-management modes of the set-top box 1, while the RC-management table also includes multiple RC-power-management modes of the remote controller 2. Each of the STB-power-management modes corresponds to one RC-power-management mode of the multiple RC-power-management modes.

Both the STB-power-management modes and the RC-management-modes include a performance mode, a voice-input mode, a TV (television) mode, a keep-alive mode, a normal mode, and a standby mode. Each of the modes is associated with a notification message. For example, the performance mode corresponds to a performance-notification message and the voice-input mode corresponds to a voice-notification message. In an embodiment, both the STB-connection parameters and the RC-connection parameters include time of connections interval, number of times of slave latency, and other parameters.

The STB-power-management parameters include duration time of scan window and time of scan-window interval. The RC-power-management parameters of the RC-management table include time of idle timeout, time of advertisement interval, and time of device mode timeout.

When activated, the set-top box 1 works in an initial STB-power-management mode which corresponds to a set of initial STB-power-management parameters and a set of initial STB-connection parameters. When the remote controller 2 connects with the set-top box 1, the remote controller 2 also works in an initial RC-power-management mode which corresponds to a set of initial RC-power-management parameters and a set of initial RC-connection parameters. In an embodiment, both the initial STB-power-management mode and the initial RC-power-management mode are normal modes. The set-top box 1 is able to update the initial STB-power-management parameters and the STB-connection parameters according to the STB-management table. Similarly, the remote controller 2 is able to update the initial RC-power-management parameters and the RC-connection parameters according to the RC-management table.

FIG. 3 illustrates an embodiment of functional modules of a multimedia system 12. In the system 12, the set-top box 1 comprises at least one processor 31, a memory 41, a communicating module 51, and a first saving power system 10. The first saving power system 10 comprises a detecting module 100 and an updating module 200. The modules 100~200 are configured to be executed by one or more processor (for example, the processor 31) to achieve functionality. The memory 41 can store codes and data as to the first saving power system 10. The set-top box 1 communicates with the remote controller 2 through the communicating module 51.

The remote controller 2 comprises at least one processor 32, a memory 42, a communicating module 52, and a second saving power system 20. The second saving power system 20 comprises an information module 300 and an updating module 400. The modules 300~400 are configured to be executed by one or more processor (for example, the processor 32) to achieve functionality. The memory 42 can store codes and data as to the second saving power system 20. The remote controller 2 communicates with the set-top box 1 through the connecting module 52.

The detecting module 100 detects currently running application or currently played contents within the set-top box 1. In an embodiment, the detecting module 100 determines whether a media player of the set-top box 1 is being used or whether a TV application is opened, and whether game applications or 2D or 3D graphic applications are running. In another embodiment, the detecting module 100 receives notification messages transmitted from the information module 300.

The updating module 200 can switch the STB-power-management modes of the set-top box 1 according to information detected by the detecting module 100. In an embodiment, when the detecting module 100 detects that a TV application is running, the updating module 200 switches the current STB-power-management mode to a TV mode according to the information. When the detecting module 100 detects that game applications or 2D or 3D graphic applications are running, the updating module 200 switches the current STB-power-management mode to a performance mode according to the detected information.

A tag is built into an application to enable recognition of the application for mode purpose. For example, a tag is built into a TV application ensures when the detecting module 100 detects that open the tag, the updating module 20 switches the current STB-power-management mode to a TV mode. In another embodiment, when the detecting module 100 receives a voice-notification message transmitted from the remote controller 2, the updating module 200 switches the current STB-power-management mode to a voice-input mode according to the voice-notification message.

The updating module 200 updates the STB-connection parameters according to the power management mode into which the set-top box 1 has been switched. In an embodiment, for example, when the STB-power-management mode is switched to a voice-input mode, the updating module 200 updates the corresponding STB-connection parameters according to the voice-input mode.

As the STB-connection parameters are being updated, the updating module 200 also transmits notification messages to the remote controller 2. The notification message informs and requires the remote controller 2 to switch the RC-power-managements mode and update the RC-connection parameters. For example, when the updating mode 200 switches the current STB-power-management-mode to a performance mode and updates corresponding STB-connection parameters, the updating module 200 simultaneously transmits a voice-notification message to the remote controller 2. The voice-notification message informs and requires the remote controller 2 to switch the RC-power-management mode to a voice-input mode and update the corresponding RC-connection parameters.

In an embodiment, the updating module 200 also updates the STB-power-management parameters according to the STB-power-management mode to switch the set-top box 1 to a matched output power.

The information module 300 receives notification messages transmitted from the set-top box 1, and transmits notification messages to the updating module 400 of the remote controller 2. In another embodiment, the information module 300 transmits notification messages to the set-top box 1 to inform the set-top box 1 to switch the STB-power-management modes and update the corresponding STB-connection parameters.

The updating module 400 switches the RC-power-management modes and updates the corresponding RC-connection parameters in accordance with notification messages transmitted from the set-top box 1. In an embodiment, when the information module 300 receives a performance-notification message transmitted from the set-top box 1, the updating module 400 switches the current RC-power-management mode to a performance mode and updates the current RC-connection parameters to RC-connection parameters corresponding to the performance mode.

In an embodiment, the updating module 400 also updates the RC-power-management parameters according to the RC-power-management mode to switch the remote controller 2 to a matched output power.

Figure 4:
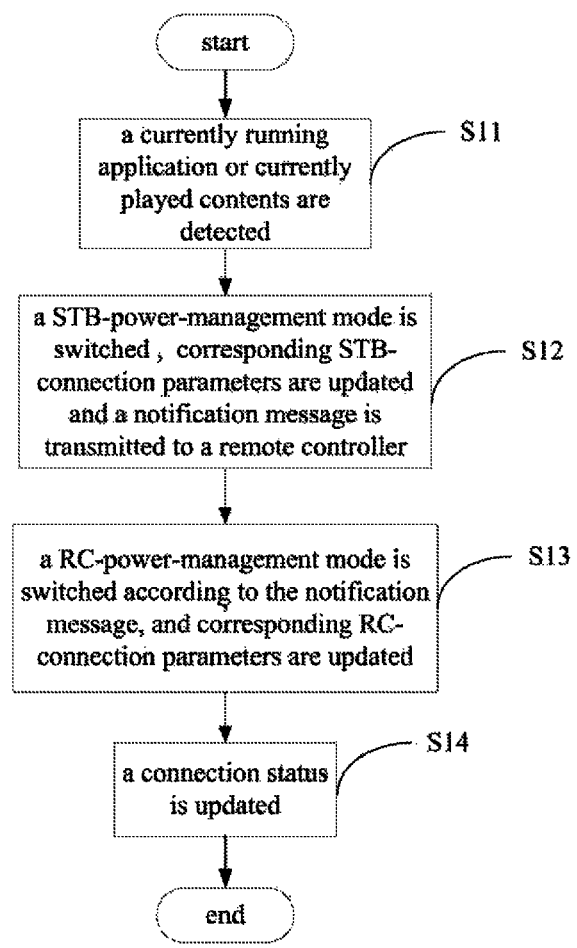
FIG. 4 illustrates a flowchart of an embodiment of a method for reducing power consumption in accordance with the present disclosure.

FIG. 4 illustrates a flowchart of an embodiment of a method for reducing power consumption in a remote controller. The method comprises:

At block S11, a currently running application or currently played contents within a set-top box are detected.

At block S12, a STB-power-management mode is switched by the set-top box according to the detected information, and corresponding STB-connection parameters are updated according to the switched STB-power-management mode. Meanwhile, a notification message is transmitted to a remote controller from the set-top box.

At block S13, a RC-power-management mode is switched by the remote controller according to the notification message, and corresponding RC-connection parameters are updated according to the switched RC-power-management mode.

At block S14, a connection status between the set-top box and the remote controller is updated.

Figure 5:
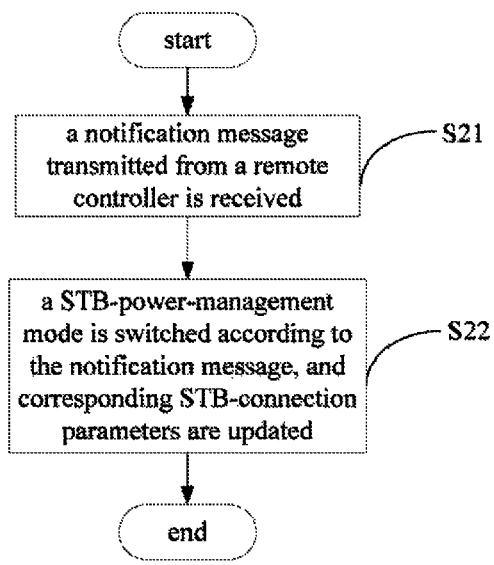
FIG. 5 illustrates a flowchart of another embodiment of a method for reducing power consumption in accordance with the present disclosure.

FIG. 5 illustrates a flowchart of an embodiment of a method for reducing power consumption in remote controller. The method comprises:

At block S21, a notification message transmitted from a remote controller is received by a set-top box.

At block S22, a STB-power-management mode is switched by the set-top box according to the notification message, and corresponding STB-connection parameters are updated according to the switched STB-power-management mode.

The set-top box and the method for reducing power consumption of the remote controller can dynamically adjust the connection states between the set-top box and the remote controller, according to a currently activated applications or currently played contents by the set-top box, to reduce the power consumption of the remote controller under a premise of ensuring the efficiency.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclo-

What is claimed is:

1. A method for reducing power consumption of a remote controller, executed by a Set-Top Box (STB) which comprises a STB-power-management table, wherein the STB-power-management table comprises multiple STB-power-management modes and multiple STB-connection parameters corresponding to the multiple STB-power-management modes, the set-top box is connected with at least one Remote Controller (RC), the method comprising:
   detecting a currently running application or currently played contents within the set-top box;
   switching an initial STB-power-management mode to a first STB-power-management mode according to the detected information;
   updating the initial STB-connection parameters to first STB-connection parameters corresponding to the first STB-power-management mode, and transmitting a first notification message to the remote controller for informing the remote controller to update initial RC-connection parameters to first RC-connection parameters corresponding to the first STB-power-management mode; and
   updating a connection status between the set-top box and the remote controller according to the first STB-connection parameters and the first RC-connection parameters.

2. The method of claim 1, further comprising:
   receiving a second notification message transmitted from the remote controller;
   switching the initial STB-power-management mode to a second STB-power-management mode according to the second notification message; and
   updating the initial STB-connection parameters to second STB-connection parameters corresponding to the second STB-power-management mode.

3. A Set-Top Box (STB), connected with at least one Remote Controller (RC) and comprising a STB-power-management table, wherein the STB-power-management table comprises multiple STB-power-management modes and multiple STB-connection parameters corresponding to the multiple STB-power-management modes, the set-top box comprising:
   at least one processor;
   a non-transitory storage system coupled to the at least one processor and configured to store one or more programs that are executed by the at least one processor, the one or more programs comprise instructions for:
   detecting a currently running application or currently played contents within the set-top box;
   switching an initial STB-power-management mode to a first STB-power-management mode according to the detected information;
   updating the initial STB-connection parameters to first STB-connection parameters corresponding to the first STB-power-management mode, and transmitting a first notification message to the remote controller for informing the remote controller to update initial RC-connection parameters to first RC-connection parameters corresponding to the first STB-power-management mode; and
   updating a connection status between the set-top box and the remote controller according to the first STB-connection parameters and the first RC-connection parameters.

4. The set-top box of claim 3, wherein the one or more programs further comprise instructions for:
   receiving a second notification message transmitted from the remote controller;
   switching the initial STB-power-management mode to a second STB-power-management mode according to the second notification message; and
   updating the initial STB-connection parameters to second STB-connection parameters corresponding to the second STB-power-management mode.

* * * * *